United States Patent
Cho et al.

(10) Patent No.: US 10,486,496 B2
(45) Date of Patent: Nov. 26, 2019

(54) SYSTEM AND METHOD OF CONTROLLING AIR CONDITIONING SYSTEM FOR VEHICLE

(71) Applicants: Hyundai Motor Company, Seoul (KR); Kia Motors Corporation, Seoul (KR)

(72) Inventors: Wan Je Cho, Gyeonggi-do (KR); Jae Yeon Kim, Gyeonggi-do (KR); Kwon Hyoung Choi, Gyeonggi-do (KR); Tae Han Kim, Seoul (KR); Ho Gyu Choi, Gyeonggi-do (KR); Su Yeon Kang, Seoul (KR); Yeon Ho Kim, Seoul (KR); Myunghwan Kim, Gyeonggi-do (KR); Yong Hyun Choi, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 123 days.

(21) Appl. No.: 15/823,887

(22) Filed: Nov. 28, 2017

(65) Prior Publication Data

US 2019/0111762 A1  Apr. 18, 2019

(30) Foreign Application Priority Data

Oct. 16, 2017  (KR) .......................... 10-2017-0134050

(51) Int. Cl.
*B60H 1/22* (2006.01)
*B60H 1/00* (2006.01)
*B60H 1/32* (2006.01)

(52) U.S. Cl.
CPC ....... *B60H 1/2221* (2013.01); *B60H 1/00392* (2013.01); *B60H 1/00557* (2013.01);
(Continued)

(58) Field of Classification Search
CPC .... G06F 11/1469; G06F 16/235; G06F 16/23; G06F 16/16; G06F 11/3034;
(Continued)

(56) References Cited

U.S. PATENT DOCUMENTS 6,347,528 B1 * 2/2002 Iritani ................ B60H 1/00357
62/324.6
2012/0159986 A1 * 6/2012 Imanishi ................ B60L 1/003
62/498

(Continued)

FOREIGN PATENT DOCUMENTS

| JP | 4285292 B2 | 6/2009 |
| JP | 5331666 B2 | 10/2013 |
| KR | 20160111577 A | 9/2016 |

*Primary Examiner* — Thomas Ingram
(74) *Attorney, Agent, or Firm* — Mintz Levin Cohn Ferris Glovsky and Popeo, P.C.; Peter F. Corless

(57) ABSTRACT

A method of controlling an air conditioning system for a vehicle is provided. The method includes detecting a cooling mode while the vehicle is being driven and comparing a vent discharge temperature of air with a cooling target temperature set by a user. When the vent discharge temperature is greater than the cooling target temperature the compressor RPM is determined and air is introduced into the vehicle without passing through the interior heat exchanger and the electric heater. When the vent discharge temperature is less than the cooling target temperature, the compressor RPM is determined and a door in the system is opened to guide the air through the interior heat exchanger to heat the air is heated and then the vent discharge temperature is compared with the cooling target temperature again, and the electric heater is operated.

8 Claims, 2 Drawing Sheets

(52) U.S. Cl.
CPC ....... *B60H 1/00878* (2013.01); *B60H 1/3211* (2013.01); *B60H 2001/224* (2013.01); *B60H 2001/2246* (2013.01); *B60H 2001/3255* (2013.01); *B60H 2001/3272* (2013.01)

(58) Field of Classification Search
CPC ............... G06F 11/1448; G06F 9/5077; G06F 11/2082; G06Q 10/101; G06Q 50/01
See application file for complete search history.

(56) References Cited

U.S. PATENT DOCUMENTS

2013/0312442 A1\* 11/2013 Suzuki ............... B60H 1/00921
                                                                   62/160
2018/0065451 A1\* 3/2018 Choi .................. B60H 1/00907

\* cited by examiner

SYSTEM AND METHOD OF CONTROLLING AIR CONDITIONING SYSTEM FOR VEHICLE

CROSS-REFERENCE TO RELATED APPLICATION

This application claims priority to and the benefit of Korean Patent Application No. 10-2017-0134050 filed on Oct. 16, 2017, the entire contents of which are incorporated herein by reference.

BACKGROUND

(a) Field of the Invention

The present invention relates to a system and method of controlling an air conditioning system for a vehicle, and more particularly, to a system and method of controlling an air conditioning system for a vehicle, which minimizes operation power consumption of an electric heater for adjusting a vent discharge temperature of air blown into a vehicle when a cooling mode is operated in an electric vehicle.

(b) Description of the Related Art

In general, an air conditioning apparatus applied to a vehicle includes an air conditioning system that cools and heats an interior of the vehicle. The air conditioning system maintains an interior temperature of the vehicle at an appropriate temperature regardless of a change in an outside temperature and is configured to heat or cool the interior place of the vehicle by a heat exchange by an evaporator in a process in which a refrigerant discharged by driving a compressor passes through a condenser, a receiver drier, an expansion valve, and an evaporator and is then circulated to the compressor again.

In other words, in a cooling mode in summer, in the air conditioning system, a high-temperature and high-pressure gas phase refrigerant compressed by the compressor is condensed through the condenser and then is evaporated in the evaporator through the receiver drier and the expansion valve to decrease interior temperature and humidity. Recently, as interests in energy efficiency and an environmental contamination issue are increased, there is a need for developing an environmentally-friendly vehicle that is capable of substantially replacing an internal-combustion engine vehicle, and the environmentally-friendly vehicle is commonly divided into an electric vehicle that is driven using a fuel cell or electricity as a power source and a hybrid vehicle that is driven by using an engine and an electric battery.

The air conditioning system applied to the electric vehicle has the same general principle in which in a cooling mode, a high-temperature and high-pressure gas-phase refrigerant compressed by a compressor is condensed through a condenser and then is evaporated in an evaporator through a receiver drier and an expansion valve to decrease an interior temperature and humidity, but has a characteristic in that the high-temperature and high-pressure gas-phase refrigerant is used as a heater medium in a heating mode.

However, when a cooling target temperature is greater than a vent discharge temperature of air blown into the vehicle when a cooling mode is operated, the air conditioning system for the electric vehicle in the related art, needs to increase the vent discharge temperature using an electric heater disposed in a heating, ventilation, and air conditioning (HVAC) module. Accordingly, the electric heater, to which power is supplied from a battery of the vehicle, is used excessively. Further, the quantity of use of the battery is increased due to frequent use and an excessive use of the electric heater, and a travelling distance of the vehicle is decreased due to an increase in the quantity of electricity used.

The above information disclosed in this section is merely for enhancement of understanding of the background of the invention and therefore it may contain information that does not form the prior art that is already known in this country to a person of ordinary skill in the art.

SUMMARY

The present invention provides a method of controlling an air conditioning system for a vehicle, which minimizes operation power consumption of an electric heater for adjusting a vent discharge temperature of air blown into a vehicle when a cooling mode is operated in an electric vehicle.

An exemplary embodiment of the present invention provides a method of controlling an air conditioning system for a vehicle, the air conditioning system including a heating, ventilation, air conditioning (HVAC) module which has an opening/closing door selectively operated to directly air passing through an evaporator into the vehicle through an operation of a blow motor or the air is introduced while passing through an interior heat exchanger and an electric heater, a compressor which is connected between the evaporator and the interior heat exchanger through a refrigerant line and configured to compress a refrigerant, a condenser which is connected with the interior heat exchanger through the refrigerant line and configured to condense the refrigerant, and an expansion valve disposed in the refrigerant line between the condenser and the evaporator, and configured to expand the refrigerant and supply the expanded refrigerant to the evaporator.

In particular, the method may include: detecting an operation of a cooling mode while a starting of a vehicle is on and the vehicle being driven, and comparing a vent discharge temperature of air with a cooling target temperature set by a user; when the vent discharge temperature is greater than the cooling target temperature, determining revolutions per minute (RPM) of the compressor, introducing air supplied into the vehicle into the vehicle without passing through the interior heat exchanger and the electric heater, and terminating the control; and when the vent discharge temperature is less than the cooling target temperature, determining the RPM of the compressor and opening the opening/closing door, guiding the air supplied into the vehicle pass through the interior heat exchanger to heat the air, and then comparing the vent discharge temperature with the cooling target temperature again, operating the electric heater, and terminating the control.

The cooling mode operation detection may include: turning on a starting of the vehicle and operating the vehicle; detecting, by the controller, whether the cooling mode is operated; and determining whether the vent discharge temperature is greater than the cooling target temperature. The determination of whether the vent discharge temperature is greater than the cooling target temperature may include determining whether the RPM of the compressor is a maximum; and when the RPM of the compressor is the maximum, closing, by the controller, the opening/closing door; and introducing the air into the vehicle in a cooled state by guiding the air to pass through the evaporator without passing through the interior heat exchanger and the electric heater, and terminating the control.

In the closing of the opening/closing door, the opening/closing door may close the sides of the interior heat exchanger and the electric heater inside the HVAC module. The method may further include, in the determination of whether the RPM of the compressor is the maximum, when the RPM of the compressor is not the maximum, increasing the RPM of the compressor, and returning to the determining of whether the vent discharge temperature is greater than the cooling target temperature.

Additionally, in the determination of whether the vent discharge temperature is greater than the cooling target temperature, when the vent discharge temperature is less than the cooling target temperature, the method may include determining whether the RPM of the compressor is a minimum and when the RPM of the compressor is the minimum (e.g., 1,000), opening, by the controller, the opening/closing door; when the opening of the opening/closing door is completed, guiding the air to pass through the interior heat exchanger. The method may further include determining whether a vent discharge temperature of the air passing through the interior heat exchanger is less than the cooling target temperature; and when the vent discharge temperature is less than the cooling target temperature, operating the electric heater and terminating the control.

The method may further include, in the determining of whether the RPM of the compressor is the minimum, when the RPM of the compressor is not the minimum, decreasing the RPM of the compressor, and returning to the determining of whether the vent discharge temperature is greater than the cooling target temperature. In the guiding of the air introduced into the vehicle to pass through the interior heat exchanger, a high-temperature and high-pressure refrigerant supplied from the compressor may be supplied to the interior heat exchanger. In the opening of the opening/closing door, the opening/closing door may open the sides of the interior heat exchanger and the electric heater inside the HVAC module to guide the air passing through the evaporator to pass through the interior heat exchanger and the electric heater.

The method may further include, in the determining whether the vent discharge temperature of the air passing through the interior heat exchanger is less than the cooling target temperature, when the vent discharge temperature is greater than the cooling target temperature, turning off the operation of the electric heater, and returning to the determining of whether the vent discharge temperature is greater than the cooling target temperature.

As described above, according to the method of controlling the air conditioning system for the vehicle according to the exemplary embodiment of the present invention, when a cooling mode is operated in an electric vehicle, the interior heat exchanger, to which a high-temperature and high-pressure refrigerant is supplied from the compressor, is provided in the HVAC module, and a temperature of air is increased by opening and closing a door and using the interior heat exchanger, thereby minimizing operation power consumption of the electric heater for adjusting a vent discharge temperature of the air blown into the vehicle. Further, the method of controlling the air conditioning system for the vehicle according to the exemplary embodiment of the present invention may prevent excessive power consumption of the electric heater, thereby increasing an overall travelling distance of the vehicle through an efficient battery management.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
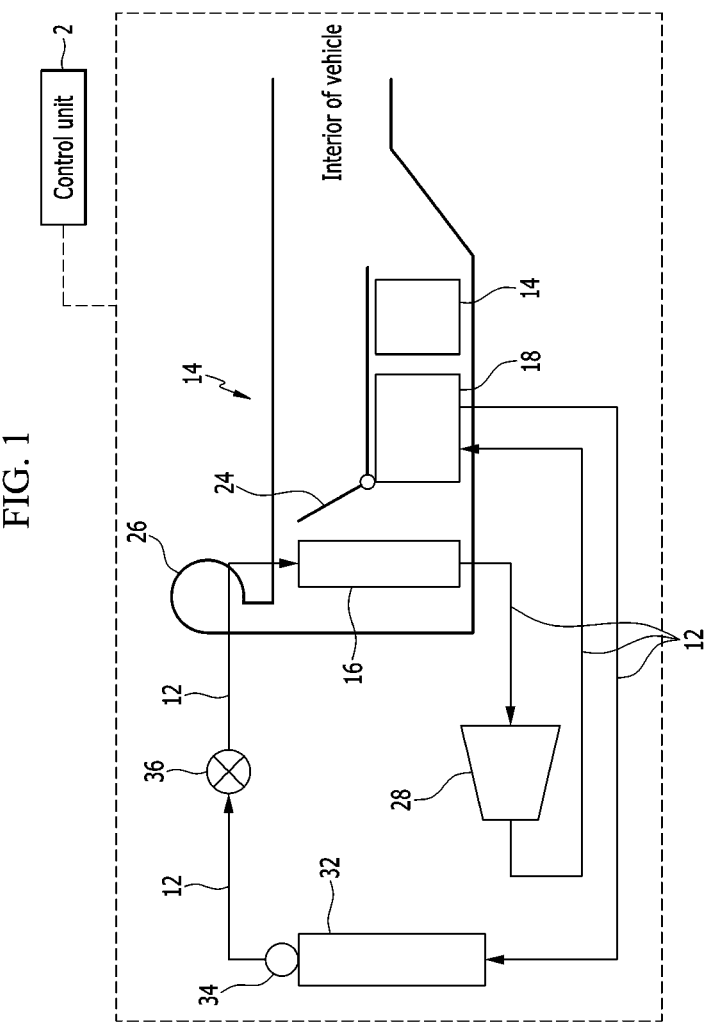
FIG. 1 is a block diagram illustrating an air conditioning system, to which a method of controlling an air conditioning system for a vehicle according to an exemplary embodiment of the present invention is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings. Before this, the exemplary embodiments described in the present specification and the configuration illustrated in the drawings are simply the exemplary embodiments of the present invention, and do not represent all of the technical spirits of the present invention, and thus it should be understood that there are various equivalents and modification examples substitutable with the exemplary embodiments described in the present specification and the configuration illustrated in the drawings at the time of filing the present application.

The drawings and description are to be regarded as illustrative in nature and not restrictive, and like reference numerals designate like elements throughout the specification. In addition, the size and thickness of each configuration shown in the drawings are arbitrarily shown for understanding and ease of description, but the present invention is not limited thereto. In addition, the terms " . . . unit", " . . . means", " . . . part", and " . . . member" described in the specification mean units of a general configuration performing at least one function or operation.

Figure 2:
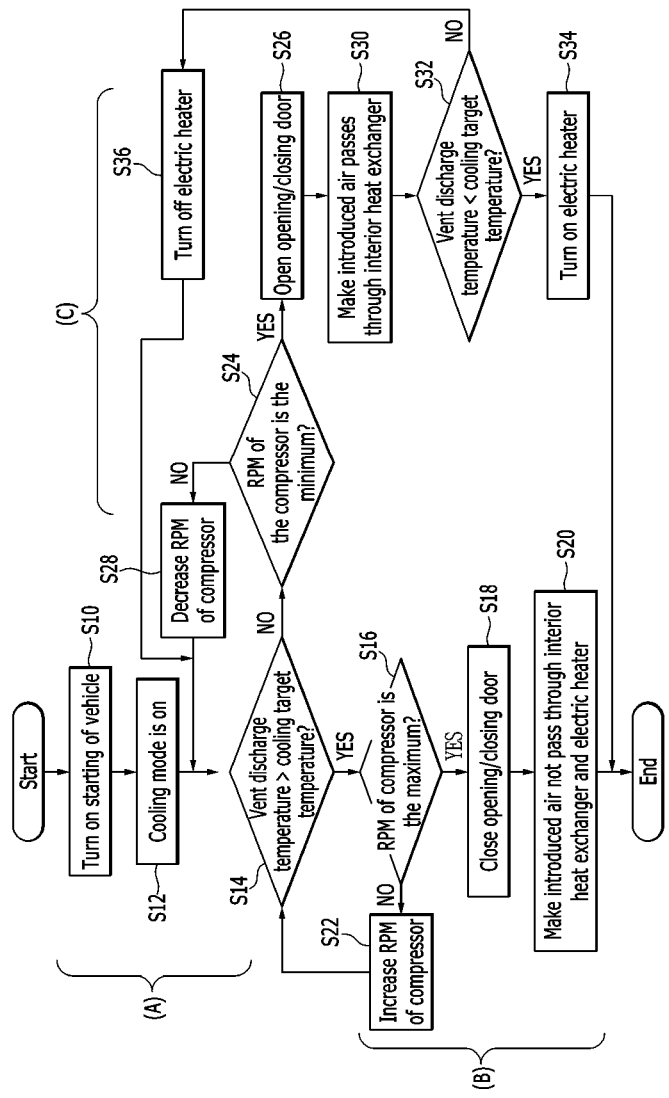
FIG. 2 is a control flow chart for describing the method of controlling the air conditioning system for the vehicle according to the exemplary embodiment of the present invention.

FIG. 1 is a block diagram illustrating an air conditioning system, to which a method of controlling an air conditioning system for a vehicle according to an exemplary embodiment of the present invention is applied, and FIG. 2 is a control flow chart for describing the method of controlling the air conditioning system for the vehicle according to the exemplary embodiment of the present invention. Referring to FIG. 1, a method of controlling an air conditioning system for a vehicle according to an exemplary embodiment of the present invention is applied to an air conditioning system operated by a controller 2.

The air conditioning system may include a heating, ventilation, and air conditioning (HVAC) module 14, a compressor 28, a condenser 32, and an expansion valve 36. The HVAC module 14 may include an opening/closing door 24 configured to selectively adjust an inflow of outside air that passes through an evaporator 16 connected to a refrigerant line 12 into an interior heat exchanger 18 and an electric heater 22 based on an interior cooling or heating mode.

In particular, the electric heater 22 may be a PTC heater which is operated by receiving power from a battery (not illustrated). The HVAC module 14 may be configured to introduce, into the vehicle, air passing through the evaporator 16 through an operation of a blow motor 26 disposed at one side thereof or air sequentially passing through the evaporator 16, the interior heat exchanger 18, and the electric heater 22. In other words, in the HVAC module 14, the opening/closing door 24 operated by the controller 2 may be configured to selectively open or close the sides of the interior heat exchanger 18 and the electric heater 22 based on a cooling or heating mode of the interior of the vehicle, thereby adjusting a flow of air.

The compressor 28 may be connected through the refrigerant line 12 between the evaporator 16 and the interior heat exchanger 18. The compressor 12 may be provided separately from the HVAC module 14 and may be configured to compress a refrigerant in a gas state as a high-temperature and high-pressure refrigerant. The condenser 32 may be connected with the interior heat exchanger 18 through the refrigerant line 12, and may be configured to compress a refrigerant. Herein, the condenser 32 may be integrally provided with a receiver drier 34.

The receiver drier 34 may be configured to remove the refrigerant in the gas state and moisture included in the refrigerant condensed by the condenser 32. The expansion valve 36 may be disposed in the refrigerant line 12 between the condenser 32 and the evaporator 18. The expansion valve 36 may be configured to receive and expand the refrigerant discharged from the condenser 32, and supply the expanded refrigerant to the evaporator 18. The air conditioning system configured as described above may be configured to cool or heat the vehicle through a circulation of the refrigerant.

Herein, as illustrated in FIG. 2, the method of controlling the air conditioning system for the vehicle according to the exemplary embodiment of the present invention may include detecting, by a controller, an operation of a cooling mode while a starting of the vehicle is on and the vehicle is being driven, and comparing a vent discharge temperature of air with a cooling target temperature set by a user, when the vent discharge temperature is greater than the cooling target temperature, determining, by the controller, revolutions per minute (RPM) of the compressor 28, introducing air supplied into the vehicle without passing through the interior heat exchanger 18 and the electric heater 22, and terminating the operation, and when the vent discharge temperature is less than the cooling target temperature, determining, by the controller, the RPM of the compressor and opening the opening/closing door, to guide the air supplied into the vehicle to pass through the interior heat exchanger to heat the air is heated, and then comparing the vent discharge temperature with the cooling target temperature again, operating the electric heater, and terminating the control.

In addition, a user may turn on a starting of the vehicle and the vehicle may be driven accordingly (S10). In other words, the user may turn on the vehicle to operate the vehicle. Then, the controller 2 may be configured to detect whether the cooling mode of the vehicle is operated (S12), and determine whether the vent discharge temperature of the air supplied into the vehicle is greater than the cooling target temperature (S14). In the determining of whether the vent discharge temperature is greater than the cooling target temperature, when the vent discharge temperature is greater than the cooling target temperature, the controller 2 may be configured to determine whether the RPM of the compressor 28 is a maximum (e.g., about 8,600) (S16).

In the determining of whether the RPM of the compressor 28 is the maximum (S16), when the RPM of the compressor 28 is the maximum, the controller 2 may be configured to close the opening/closing door 24 to prevent the air passing through the evaporator 16 from passing through the interior heat exchanger 18 and the electric heater 22 (S18). In other word, in the closing of the opening/closing door 24 (S18), the opening/closing door 24 may close the sides of the interior heat exchanger 18 and the electric heater 22 inside the HVAC module 24 by the controller 2.

When the closing of the opening/closing door 24 is completed, the air introduced into the vehicle may be introduced in a cooled state by passing through only the evaporator 16 without passing through the interior heat exchanger 18 and the electric heater 22 (S20), and the operation may be terminated. Herein, a low-temperature and low-pressure refrigerant, which sequentially passes through the compressor 28, the interior heat exchanger 18, the condenser 32, and the expansion valve 36 that are connected with one another through the refrigerant line 12, may be introduced into the evaporator 16. Accordingly, the air supplied by the operation of the blow motor 26 may be cooled while passing through the evaporator 16, to which the low-temperature and low-pressure refrigerant is supplied, and may be supplied into the vehicle, thereby cooling the interior of the vehicle.

In the meantime, in the determining of, by the controller 2, whether the RPM of the compressor 28 is the maximum, when the RPM of the compressor 28 is not the maximum (e.g., is less than a maximum), the controller 2 may be configured to increase the RPM of the compressor (S22), and return to the determining of whether the vent discharge temperature is greater than the cooling target temperature (S14). Then, the respective operations may be repeatedly performed. In the operation (C), n the determining of whether the vent discharge temperature is greater than the cooling target temperature, when the vent discharge temperature is less than the cooling target temperature, the controller 2 may be configured to determine whether the RPM of the compressor 28 is the minimum (S24).

In the determining of whether the RPM of the compressor 28 is the minimum (S24), when the RPM of the compressor 28 is the minimum, the controller 2 may be configured to open the opening/closing door 24 (S26). In other words, in the opening of, by the controller 2, the opening/closing door 24 (S26), the opening/closing door 24 may open the sides of the interior heat exchanger 18 and the electric heater 22 inside the HVAC module 14 to allow the air passing through the evaporator 16 to pass through the interior heat exchanger 18 and the electric heater 22.

In the meantime, in the determining of, by the controller 2, whether the RPM of the compressor 28 is the minimum (S24), the RPM of the compressor 28 is greater than the minimum, the controller 2 may be configured to decrease the RPM of the compressor 28 (S28), and return to the determining of whether the vent discharge temperature is greater than the cooling target temperature (S14). Then, the respective operations may be repeatedly performed.

When the opening of the opening/closing door 24 is completed, the air, which is cooled while passing through the evaporator 16 and is to be introduced into the vehicle by the operation of the blow motor 26, may pass through the interior heat exchanger 18 (S30). Herein, a high-temperature and high-pressure refrigerant supplied from the compressor 28 may be supplied to the interior heat exchanger 18. Accordingly, the air has an increased temperature through the heat exchange while passing through the interior heat exchanger 18. Then, the controller 2 may be configured to determine whether a vent discharge temperature of the air passing through the interior heat exchanger 18 is less than the cooling target temperature (S32).

In particular, when the vent discharge temperature is less than the cooling target temperature, the controller 2 may be configured to operate the electric heater 22 and terminate the operation. Further, the air passing through the interior heat exchanger 18 has a further increased temperature while passing through the operated electric heater 22 and may be blown or guided into the vehicle. Accordingly, the cooling target temperature set by the user may be the same as the vent discharge temperature of the air supplied into the vehicle.

In the meantime, in the determining of, by the controller 2, whether the vent discharge temperature of the air passing through the interior heat exchanger 18 is less than the cooling target temperature, when the vent discharge temperature is greater than the cooling target temperature, the controller 2 may be configured to turn off the operation of the electric heater 22 (S36), and return to the determining of whether the vent discharge temperature is greater than the cooling target temperature (S14). Then, the respective operations may be repeatedly performed.

In other words, when the cooling mode of the vehicle is operated, the method of controlling the air conditioning system may include comparing the cooling target temperature set by the user with the vent discharge temperature of the air blown into the vehicle and determining a difference between the cooling target temperature and the vent discharge temperature in real time. Then, when an increase in the vent discharge temperature is demanded based on user input, the method the air may first pass through the interior heat exchanger 18 to have an increased temperature through the heat exchange, thereby minimizing the operation of the electric heater 22.

Accordingly, when the method of controlling the air conditioning system for the vehicle according to the exemplary embodiment of the present invention, which is configured as described above, is applied, when the cooling mode is operated in the electric vehicle, the interior heat exchanger 18, to which a high-temperature and high-pressure refrigerant is supplied from the compressor 28, may be disposed in the HVAC module 14, and a temperature of air may be increased by controlling the opening/closing door 24 and using the interior heat exchanger, thereby minimizing operation power consumption of the electric heater 22 for adjusting a vent discharge temperature of the air blown into the vehicle.

Further, the method of controlling the air conditioning system for the vehicle according to the exemplary embodiment of the present invention may prevent excessive power consumption of the electric heater 22, thereby increasing an entire travelling distance of the vehicle through an efficient battery management.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

2: Controller
12: Refrigerant line
14: HVAC module
16: Evaporator
18: Interior heat exchanger
22: Electric heater
24: Opening/closing door
26: Blow motor
28: Compressor
32: Condenser
34: Receiver drier
36: Expansion valve

What is claimed is:

1. A method of controlling an air conditioning system for a vehicle, the air conditioning system including a heating, ventilation, air conditioning (HVAC) module and an expansion valve, the method comprising:
    detecting, by a controller, an operation of a cooling mode while starting the vehicle and the vehicle is being driven, and comparing a vent discharge temperature of air with a cooling target temperature set by a user;
    when the vent discharge temperature is greater than the cooling target temperature, determining, by the controller, revolutions per minute (RPM) of a compressor, introducing air supplied into the vehicle without passing through an interior heat exchanger and an electric heater, and terminating the operation, wherein the compressor is connected between the evaporator and the interior heat exchanger through a refrigerant line;
    when the vent discharge temperature is less than the cooling target temperature, determining, by the controller, the RPM of the compressor and opening a door disposed within the HVAC module, to guide the air supplied into the vehicle pass through the interior heat exchanger to heat the air is heated, and then comparing the vent discharge temperature with the cooling target temperature again, operating the electric heater, and terminating the operation;
    determining, by the controller, whether the RPM of the compressor is a maximum when the vent discharge temperature is greater than the cooling target temperature;
    closing, by the controller, the door when the RPM of the compressor is the maximum; and introducing the air into the vehicle in a cooled state by guiding the air to pass through only the evaporator without passing through the interior heat exchanger and the electric heater.

2. The method of claim 1, wherein in the closing of the door, the door closes the sides of the interior heat exchanger and the electric heater inside the HVAC module.

3. The method of claim 1, further comprising:
increasing, by the controller, the RPM of the compressor when the RPM of the compressor is less than the maximum, and returning to the determining of whether the vent discharge temperature is greater than the cooling target temperature.

4. The method of claim 1, further comprising:
determining, by the controller, whether the RPM of the compressor is a minimum when the vent discharge temperature is less than the cooling target temperature;
opening, by the controller, the door when the RPM of the compressor is the minimum;
when the door is opened, guiding the air to pass through the interior heat exchanger;
determining, by the controller, whether a vent discharge temperature of the air passing through the interior heat exchanger is less than the cooling target temperature; and
operating, by the controller, the electric heater when the vent discharge temperature is less than the cooling target temperature.

5. The method of claim 4, further comprising:
decreasing, by the controller, the RPM of the compressor, and returning to the determining of whether the vent discharge temperature is greater than the cooling target temperature when the RPM of the compressor is greater than the minimum.

6. The method of claim 4, wherein in the guiding of the air introduced into the vehicle to pass through the interior heat exchanger, a high-temperature and high-pressure refrigerant supplied from the compressor is supplied to the interior heat exchanger.

7. The method of claim 4, wherein in the opening of the door, the door opens the sides of the interior heat exchanger and the electric heater inside the HVAC module to allow the air passing through the evaporator to pass through the interior heat exchanger and the electric heater.

8. The method of claim 4, further comprising:
turning off, by the controller, the operation of the electric heater, and returning to the determining of whether the vent discharge temperature is greater than the cooling target temperature when the vent discharge temperature is greater than the cooling target temperature.

* * * * *